Nov. 27, 1962         C. GROSS         3,065,658
TRIMMING DEVICE OF EDGE TRIMMING APPARATUS
Filed Oct. 20, 1959
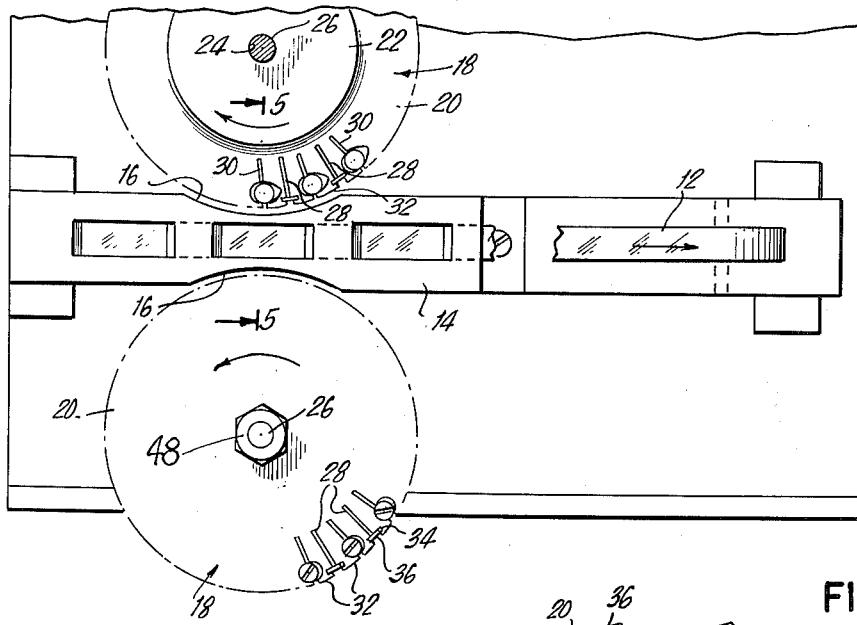
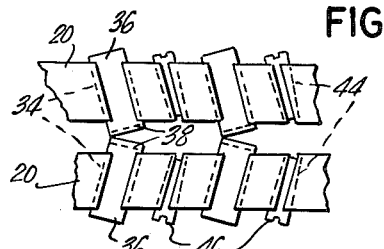
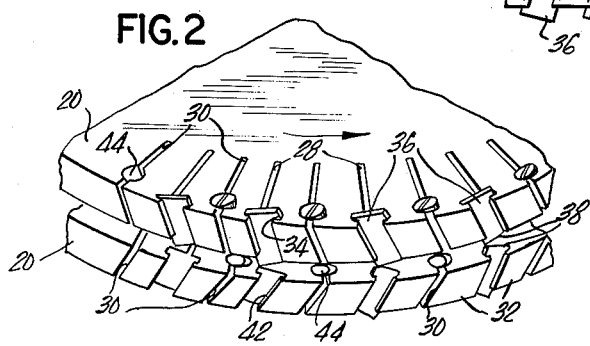
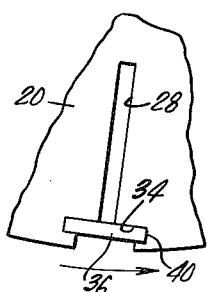
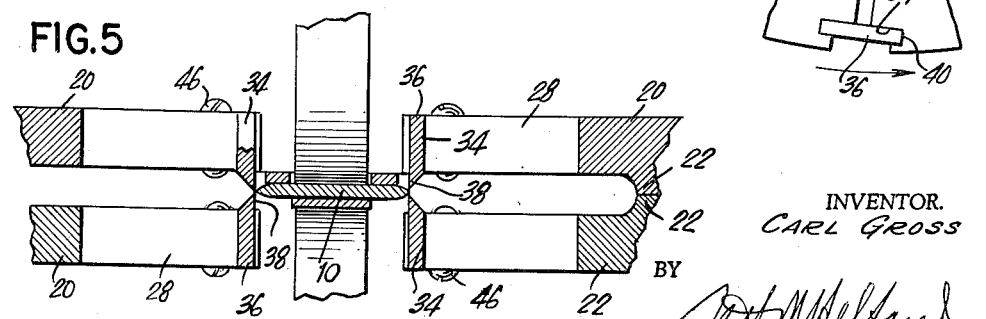
INVENTOR.
CARL GROSS
BY
ATTORNEY

United States Patent Office 3,065,658
Patented Nov. 27, 1962

3,065,658
TRIMMING DEVICE OF EDGE TRIMMING
APPARATUS
Carl Gross, 141—33 78th Road, New York, N.Y.
Filed Oct. 20, 1959, Ser. No. 847,548
12 Claims. (Cl. 83—673)

The present invention relates to apparatus for trimming the edges of strips of material, particularly for trimming the edges or strips of fibrous material, especially leather, such as the edges of leather belts or straps, and is especially directed to the cutters or trimmers of the apparatus. The present invention constitutes an extension or improvement of my invention described and claimed in my co-pending application Serial No. 732,844, filed May 5, 1958, and now abandoned.

The present invention relates to edge-trimming apparatus of the general type in which a strip of approximately rectangular material is fed between two spaced, oppositely rotating, trimming-blade mounting discs, whose blades slightly overlap the substantially parallel edges of the moving strip, to trim the same as the strip is progressed between the trimming discs. The trimming discs are generally formed to provide two oppositely directed sets of blades for trimming the edge passed between them from above and below.

In my said co-pending application, I have described an apparatus having cutting or trimming discs each of generally cylindrical shape and provided with a peripheral groove to fit over the edge of an advancing fabric strip and on which a series of blades are mounted and held against the periphery of the disc, above and below the groove, with their cutting edges converging and overlapping the groove and facing the direction of the rotation of the cutting disc.

The present invention is directed to the provision of an improved edge-trimming disc, utilizing cutting blades of simpler construction, that are easier and more economical to produce, and to maintain in sharp and generally adequate cutting condition.

The present invention is also directed to the provision of a single trimming disc unit from which trimming discs for either side of an apparatus, for trimming from above and below the moving strip, may be assembled, to thereby simplify the construction of the edge trimmers and make them simple and more economical to produce.

The present invention is additionally directed to improved means for mounting the blades on the trimming disc unit, whereby they are supported and held in place more securely and with increased protection against damage to the cutting edges from inadvertent contact with other objects.

The present invention is further directed to the provision of trimming disc units of the character described in which the mounting means for the individual blades are of improved character to increase the facility and speed with which the individual blades may be mounted in place, removed and replaced.

The foregoing and other objects and advantages of the edge-trimming discs for edge-trimming apparatus of the present invention will become more readily apparent to those skilled in the art from the embodiment thereof shown in the accompanying drawing and from the description following. It is to be understood, however, that such embodiment is shown by way of illustration only, to make the principles and practice of the invention more readily comprehensible, and without any intent of limiting the invention to the specific details therein shown.

In the drawing:

FIG. 1 is a more or less diagrammatic, fragmentary top plan view, partly in horizontal section, showing edge-trimming apparatus provided with the cutting or trimming discs of the present invention;

FIG. 2 is a perspective view of a segment of an edge-trimming disc of the present invention, on an enlarged scale; the arrow indicating the direction of rotation in operation;

FIG. 3 is a fragmentary development of the periphery of the edge-trimming disc shown in FIG. 2;

FIG. 4 is an enlarged, fragmentary top plan view of the edge-trimming disc, showing greater detail of the blade-holding means thereof; and FIG. 5 is an enlarged, fragmentary, sectional more or less diagrammatic view taken on line 5—5 of FIG. 1.

Referring now, in greater detail, to the embodiment of the invention, more or less diagrammatically shown in the accompanying drawing, in the form of apparatus for trimming the edges of a strip of material, the same comprises means for supporting and advancing the work, shown as a leather strap, 10, which includes an endless work-moving belt, 12, mounted on any suitable advancing mechanism, not thought necessary to be specifically shown in detail. The apparatus also includes a guide frame, 14, for the work, of substantially equal width therewith, which is mounted in spaced relation to the work-moving belt 12, above the work 10, and is formed with a narrowed portion defined by opposed arcuate cut-outs, 16, which expose the edges of the work 10 as it is moved on the belt 12. The apparatus is also provided with a pair of cylindrical edge trimming members, each generally designated as 18, each of which extends into one of the arcuate cut-outs 16 to cut and trim the exposed edge portions of the advancing work 10.

The edge trimmers of the apparatus of the invention may each be formed of a pair of substantially identical units that may be superposed on one another in spaced, reversed relation. Each such unit comprises a flat plate, 20, preferably of generally cylindrical or disc shape and formed of an inherently resilient material, such as steel. Each of the cylindrical plates or discs 20 is formed with a central, preferably circular embossment or stud, 22, on one of its surfaces, which is concentric with and of substantially lesser radius than the disc 20, and is also provided with a preferably round, central, axially extending opening, 24, by which it may be mounted on a driving shaft, 26, in the conventional manner.

Each disc 20 is formed with a preferably evenly-spaced, even-numbered plurality of slots extending inwardly from its edge and terminating preferably short of its embossment 22; alternate of such slots being respectively numbered 28 and 30. The slots 28 and 30 are each formed at an angle to the axis of the disc 20, arranged to slope downwardly toward the embossed side thereof, in the direction of rotation of the disc, when operatively mounted; such slots 28 and 30 being separated from one another by the outwardly widening fingers, 32, whose cross-section is a parallelogram. Preferably, the slots 28 and 30 are formed at a slight angle to a radius of the disc, as on a tangent to the center opening 24 thereof. As many as 36 such slots may be provided in a disc of 5-inch diameter.

The disc 20 is provided with a transverse slot, 34, formed across each of slots 28, adjacent its outer end; such slot 34 extending into each of the fingers 32 bordering the same and having its vertical sides substantially parallel to the sides of the slot 28 which it crosses, so as to also be of parallelogram shape. Each of transverse slots 34 serves as a seat or socket for holding a rectangular cutting blade, 36, having the cutting edge, 38, which blade is disposed in the slot 34 with its cutting edge projecting therefrom on the side of the embossment 22. It will be apparent that, as the socket 34 is of parallelogram shape and the blade is rectangular, its projecting cutting edge, 38, will be disposed at an angle to the surface of the supporting disc 20, above which it projects. Preferably, the slot 34 is formed at an angle to a radius of the disc passing through its center, so that its lead end, 40, when the disc is operatively rotated, (as indicated by the arrows of the several figures of the drawing), is closer to the edge of the disc than its other end.

Each transverse slot 28 may preferably have its outer end portion, exteriorly of the slot 34, enlarged, as at 42, to facilitate engagement of a blade 36 disposed in the associated slot 34, for manipulation and adjustment.

To secure blades 36 within the transverse slots 34, conical tapped enlargements or openings, 44, are formed across each of the alternate slots 30, tapering from the flat to the embossed side of the disc 20. Such tapped openings 44 have a relatively slight taper and are formed adjacent the end of the slot 30, and at a slant, on an axis parallel to the side of the slot 30, substantially in alinement with the transverse slots 34. Each of the tapped openings 44 receives a conformingly tapered screw, 46, which, it will be apparent, upon deeper insertion into the tapped opening 44, spreads the two bordering fingers 32 apart and tightens each one of them against the blade 36 held in each of the contiguous transverse slots 34; such result being made possible by the inherent resilience of the material from which the disc 20 is formed. Conversely, the loosening of a screw 46 in a tapped opening 44 permits the adjacent fingers to move back to normal position, thereby loosening said fingers from the blade held in the adjacent slot 34. It will be understood, of course, that each of the blades 36 is of such width as to fit closely, though freely slidably within a slot 34, so that even the minor distortion of one of the fingers 32, in which such slot is partly formed, will be sufficient to secure a blade within such slot.

In use, a pair of such discs 20 has a blade 36 inserted into each of the slots 34 thereof, with the cutting edges of the blade projecting on the embossed side of the disc 20. The pair of such discs 20 are then mounted on the driving shaft 26 of the apparatus with their embossments 22 in abutment with one another and with the points of the cutting edges 38 of the blade 36 in substantial register, and are secured in place on such shaft, as by the nut, 48; thereby forming an edge trimming member having two rows of oppositely pointing, divergent, cutting edges, 38, all facing the same direction and capable of trimming an edge of an article from both opposite sides.

This completes the description of the edge trimmers for the edge-trimming apparatus of the present invention. It will be readily apparent that such edge trimmers present numerous advantages to the user. They are of highly simplified construction because they are formed of a multiple of identical units which are of relatively simple construction and readily interchangeable. They utilize cutting blades of simplest construction, on which the cutting edge is easiest to form and to sharpen, and which, because of their shape and the shape of the blade sockets into which they are set, are simplest to insert into place without the need of attention or care about cutting edge orientation. They also provide blade securing means which are easiest and simplest to manipulate; requiring but a tightening or loosening of a screw and obviating the need for removal and replacement of any parts or elements that may be easily misplaced or spoiled, and are relatively costly to provide.

While the foregoing embodiment of the present invention is a preferred one, it will be apparent that it may be varied in a number of ways without the loss of all of its advantages. Thus, slots 28 and 30 and 34 may be formed with their sides parallel to the axis of the disc and the blades 36 may be formed with the cutting edge 38 at an angle to the adjacent two parallel sides, and the tapped openings 44 likewise may be formed with their axis parallel to the axis of the disc 20, without materially affecting the utility of the trimmer.

It is further apparent that numerous other modifications and variations may be made in the trimmers for edge-trimming apparatus of the present invention, by anyone skilled in the art, in accordance with the principles of the invention hereinabove set forth, and without the exercise of any inventive ingenuity. I desire, therefore, to be protected for any and all such modifications and variations that may be made within the spirit of the present invention and scope of the claims hereto appended.

What I claim is:

1. An edge-trimming unit for edge-trimming apparatus of the character described, comprising a substantially circular rigid plate of a material having inherent resilience, said plate having a central opening formed therethrough for mounting on a driving shaft, and having a plurality of substantially evenly-spaced slots formed therein extending inwardly from its edge, said plate having slots formed therethrough extending transversely to alternate of said first slot adjacent their outer ends, said plate having a tapered threaded opening formed therethrough across the others of said slots adjacent their ends, a blade having a cutting edge disposed in each of said transverse slots, said blades arranged with their cutting edges projecting from one of the parallel sides of said plate and a tapered screw adjustably set into each of said threaded openings.

2. The edge-trimming unit of claim 1, wherein a spacing embossment is formed centrally on one side of said plate, said threaded openings tapering in the direction of said embossed side of said plate and said cutting edges of said blades projecting on the side of said embossment.

3. The edge-trimming unit of claim 1, wherein said cutting edges of said blades are disposed at a common angle to the surface of said plate from which they project.

4. The edge-trimming unit of claim 1, wherein said first-named slots are formed with their sides at a common angle to the axis of said plate and said transverse slots have their end walls disposed parallel to the sides of said slots, and said threaded openings are formed with their longitudinal axis at a corresponding angle to said plate axis and said blades are of rectangular shape.

5. An edge-trimming unit for an edge-trimming apparatus of the character described, comprising a substantially circular rigid plate of a material having inherent resilience, said plate having a central embossment on one side thereof and a central opening formed therethrough for mounting on a driving shaft, said plate having a plurality of slots formed therein extending inwardly from the edge thereof and dividing the periphery of said plate into a plurality of approximately radially extending fingers, said plate having a transverse slot formed therein extending across each alternate of said slots into the adjacent fingers adjacent their ends, said plate having a tapering threaded opening formed therein across each of the other of said slots extending into the adjacent fingers on each side thereof, a cutting blade having a cutting edge inserted into each of said transverse slots with its cutting edge projecting from the embossed side of said plate and a corresponding tapered screw set into each of said tapered openings.

6. The edge-trimming unit of claim 5, wherein said transverse slots have their end walls parallel and at an angle to the axis of said plate and said blades are of rectangular shape.

7. The edge-trimming unit of claim 5, wherein said first-named slots are formed with their sides at an angle to the axis of said plate, said transverse slots have their end walls substantially parallel to one another and to the sides of said first slots, and said blades are of rectangular shape, and said threaded openings are formed with their longitudinal axis substantially parallel to the side walls of said first-named slots.

8. An edge trimming device for edge trimming apparatus of the character described, comprising a pair of substantially identical trimming units, each comprising a substantially circular rigid plate of a material having inherent resilience, said plate having a central opening formed therethrough for mounting on a rotary driving shaft and having a plurality of substantially evenly spaced slots formed therein extending inwardly from its periphery, said plate having slots formed therethrough extending across alternate of said first named slots into the marginal edge portions of said alternate slots adjacent the periphery of said plate, a blade having a cutting edge disposed in each of said transversely extending slots, said blades arranged with their cutting edges projecting from one common parallel side of said plate with the cutting edge of each said blade disposed at an angle to said plate face parallel to that of the cutting edge of the other blades, and means releasably engageable on said plate for pressing the edges of each of said transversely extending slots against the edges of the cutting blade held therewithin, said plates disposed on one another with their cutting blades edges facing and in register with one another and means spacing said plates to keep the cutting edges of their cutting blades from overlapping.

9. The edge trmming device of claim 8, wherein said means for spacing said plates comprises an embossment on at least one of said plates on the blade projecting side thereof surrounding said opening therein.

10. The edge trimming device of claim 8, wherein the means for pressing the sides of each said transversely extending slots against the edges of a cutting blade disposed therein comprises a threaded opening formed in said plate across each of the other of said inwardly extending slots, said threaded openings each tapering in the direction of the blade projecting side of said plate, and a tapered screw set into each of said tapered threaded openings.

11. The edge trimming device of claim 8, wherein said first named slots are formed with their sides at a common angle to the parallel sides of said plate and said transverse slots have their end walls parallel to the sides of said first named slots, and said threaded openings are formed with their longitudinal axis parallel to said first named slot sides.

12. An edge trimming unit for edge trimming apparatus of the character described, comprising a substantially circular rigid plate having a central opening formed therethrough for mounting on a driving shaft, and having a plurality of substantially evenly spaced slots formed therein extending inwardly from its periphery, said plate having slots formed therethrough extending transversely of alternate of said first named slots into the marginal edge portions thereof adjacent the periphery of said plate, a blade having a cutting edge disposed in each of said transversely extending slots with its cutting edge projecting from one of the parallel sides of said plate, and releasable means on said plate for pressing the end faces of each of said transversely extending slots against the edges of the cutting blade disposed within the slot.

References Cited in the file of this patent

UNITED STATES PATENTS

| 447,900 | Pallen | Mar. 19, 1891 |
| 530,793 | Odgers | Dec. 11, 1894 |
| 1,125,602 | Thoren | Jan. 19, 1915 |
| 1,714,700 | Stull | May 28, 1929 |
| 1,747,713 | Havlista | Feb. 18, 1930 |
| 1,884,460 | Williams | Oct. 25, 1932 |
| 2,309,410 | Miller | Jan. 26, 1943 |
| 2,381,808 | Davis et al. | Aug. 7, 1945 |
| 2,916,804 | Cyr | Dec. 15, 1959 |

FOREIGN PATENTS

| 967,127 | France | Mar. 22, 1950 |
| 523,056 | Italy | Apr. 13, 1955 |